Nov. 25, 1958
E. R. HANSZ
2,861,472
TORSIONAL VIBRATION DAMPER
Filed Feb. 10, 1953
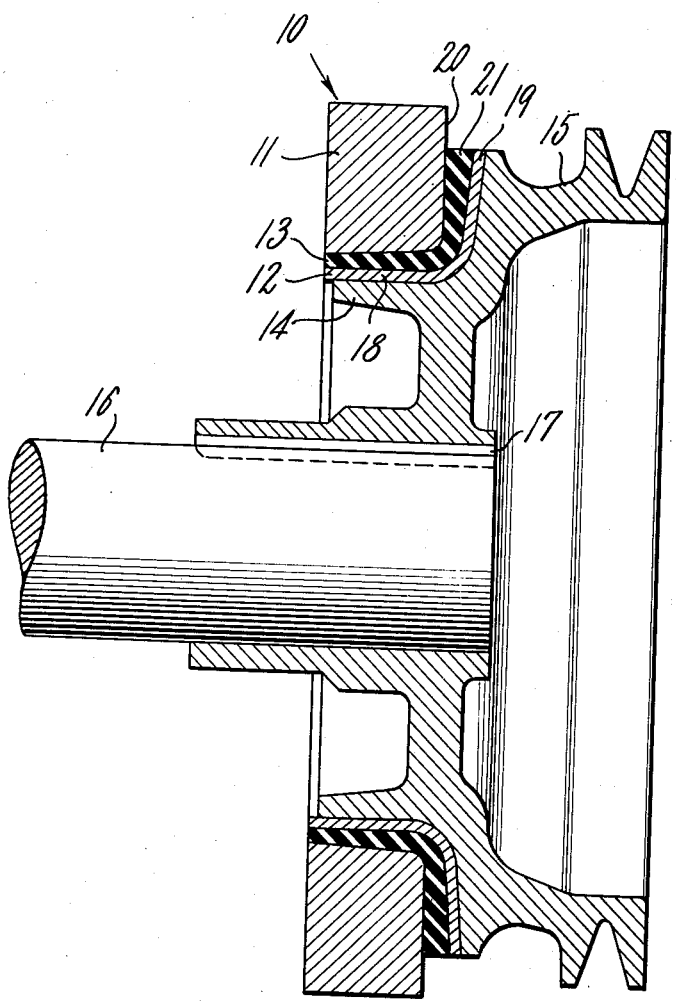
INVENTOR.
EDWARD R. HANSZ
BY
ATTORNEY United States Patent Office 2,861,472
Patented Nov. 25, 1958

2,861,472

TORSIONAL VIBRATION DAMPER

Edward R. Hansz, New Haven, Ind., assignor to United States Rubber Company, New York, N. Y., a corporation of New Jersey Application February 10, 1953, Serial No. 336,130

1 Claim. (Cl. 74—574)

This invention relates to improved torsional vibration dampers for use in combination with shafts.

Torsional vibration dampers are applied to shafts to dampen torsional vibrations that may be induced therein by torque applying forces, which may become periodic and resonant. Such dampers comprise an inertia ring which is resiliently secured to the shaft in concentric relation thereto so that its natural frequency of vibration about the axis of the shaft is out of phase with the natural torsional frequency of vibration of the shaft.

Heretofore the inertia member was in the form of an inertia ring and it has been resiliently connected to the shaft or to a rotatable member, such as a pulley, adapted to be connected to the shaft. The rubber was either directly connected to the pulley by molding it between and bonding it by vulcanization to the inertia ring and a hub on the pulley, or the rubber was indirectly connected to the pulley by molding it between and bonding it by vulcanization to the inertia ring and to an intermediate ring which was secured to the pulley by welding or an additional fastener.

In accordance with the present invention the improved torsional vibration damper is made and assembled on the shaft or a rotatable member adapted to be concentrically secured thereto in a more efficient manner by eliminating the cost of heating the rotatable member and making a mold to hold the shaft or the rotatable member adapted to be connected thereto, and by eliminating the welding, or separate fasteners for securing the intermediate metal member to the shaft or the rotatable member. To this end, the improved damper is secured in place by a press fit.

This invention is further described in reference to the accompanying drawings, in which:

The single figure is a diametrical cross section of the improved torsional vibration damper, which is assembled on a pulley affixed to the end of a shaft for dampening the torsional vibrations which may be induced therein.

The torsional vibration damper 10 comprises an inertia ring 11 which is resiliently secured to an inner metal ring 12 by a rubber ring 13, which is interposed between and adhesively united to the inertia ring 11 and the inner ring 12. The damper 10 is affixed to a hub 14 of a pulley 15, which is affixed to the end of a shaft 16 by a key 17. The expansion of the cylindrical band 18 of the inner metal ring 12 by the press fit operation relieves the radial shrinkage stresses in the rubber ring 13 between the band 18 and the inertia ring 11 resulting from the cooling of the damper after being molded. The relief of these stresses increases the life of the rubber part. In order to facilitate the manufacture of the damper 10 and its assembly on the pulley 15, the damper 10 is made separately from the pulley 15. The damper parts comprising the inertia ring 11 and the inner ring 12, with the raw unvulcanized rubber composition of the rubber ring 13 sandwiched therebetween, are placed in a mold. The raw rubber of the ring 13 is then vulcanized and simultaneously bonded to the opposing surfaces of the inertia ring 11 and inner ring 12 in accordance with conventional practice. As shown in the drawings, the inner metal ring 12 is provided with a cylindrical band 18 having a radial flange 19 extending outwardly therefrom along the adjacent face 20 of the inertia ring 11. In order to equalize the stresses in the flange 21 of the rubber ring 13 when relative motion takes place between the inertia ring 11 and the inner metal ring 12, the rubber flange 21 is made thicker on its outer diameter than on its inner diameter by arranging the opposite faces of the inertia ring 11 and the flange 19 in divergent relation to each other in the direction of their outer circumferences.

The damper 10 thus formed is then secured to the pulley 15 by pressing the band 18 of the inner metal ring 12 over the hub 14 of the pulley. It has been found that when the hub 14 of the pulley is approximately 4.12 inches in diameter and the inner diameter of the cylindrical band 18 is .006 inch to 0.10 inch less than the outer diameter of the hub 14, a press fit having the required resistance to torque slippage is obtained.

It will thus be seen that this method eliminates the necessity of making costly molds and of heating large pulleys in the mold, or prior to placing such members in the mold. Furthermore better adhesion can be obtained between the rubber and the metal parts when the mass of metal in the mold is reduced to the minimum. The invention has the further advantage of facilitating the assembly of the damper onto the rotatable member, such as the pulley 15, which is affixed to the shaft 16. The press fit between the inner ring 12 and the hub 14 of the pulley 15 eliminates welds between such members, which injure the bond between the rubber and the metal parts, and it also eliminates all separate fastening elements for securing the damper to the shaft.

While the preferred form of this invention has been described more or less in detail herein, it is to be understood that changes may be made without departing from the spirit of the invention, and it is intended to cover such changes in the appended claim.

Having thus described my invention, what I claim and desire to protect by Letters Patent is:

The combination of a torsional vibration damper for a shaft and a rotatable member adapted to be rigidly connected to the shaft, comprising an inertia ring, an inner metal ring having a cylindrical band and a radial flange extending therefrom along one face of said inertia ring, a resilient rubber ring having a shape symmetrical with that of said inner metal ring, said rubber ring being interposed between and adhesively secured to said inertia ring and said inner metal ring, said cylindrical band being expanded over and secured to said rotatable member by frictional engagement therewith, and the rubber of said rubber ring between said band and said inertia ring being free from shrinkage stresses by virtue of the expansion of said band.

References Cited in the file of this patent

UNITED STATES PATENTS

| | | |
|---|---|---|
| 1,892,793 | Warner | Jan. 3, 1933 |
| 2,032,900 | Alger | Mar. 3, 1936 |
| 2,049,133 | Pierce | July 28, 1936 |
| 2,209,477 | Riebel | July 30, 1940 |
| 2,585,382 | Guernsey | Feb. 12, 1952 |